ated Oct. 18, 1955

2,721,111
OIL AND SPIRIT SOLUBLE AZO DYESTUFFS

Robert S. Long, Bound Brook, N. J., Walter P. Green, Jr., Laurel, Miss., and Norman W. Fiess, Ringoes, N. J., assignors to American Cyanamid Company, New York, N. Y., a corporation of Maine No Drawing. Application August 1, 1951,
Serial No. 239,848

5 Claims. (Cl. 8—26)

This invention relates to spirit and oil-soluble azo coloring matters comprising salts of the dyestuff of the formula

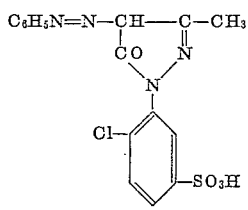

with aminoalkyl polyalkyl polyhydrophenanthrenes of the formulae

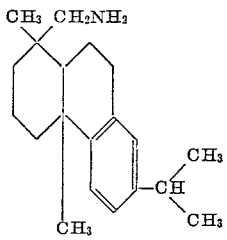 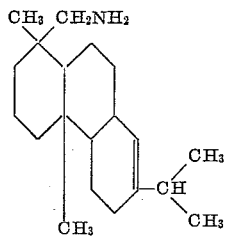

The azo dyestuff itself, which is yellow in color has hitherto been unavailable in a form which dissolves readily in oils and alcohols. The ordinary amine salts of the dyestuff such as salts with cyclohexylamine and even dicyclohexylamine produce compounds which show very low solubility in alcohols such as methanol. They have therefore been unavailable for use in the spirit color field or, at best, their use has been seriously restricted by their low solubility. The compounds of the present invention, on the other hand, show the surprising property of good solubility both in alcohols and similar polar solvents and in non-polar solvents such as hydrocarbons and halogenated hydrocarbons. As a result, colors are obtained which can be used both in spirit lacquers and in the coloring of gasolines, oils, wood stains, tinting of metal films, papers, plastic materials and the like. It is not known why the aminoalkyl polyalkyl polyhydrophenanthrene salts show this unusual solubility in the two very different classes of solvents, whereas the ordinary salts of the dyestuff have such low solubilities as to be of little value for many uses. Accordingly, the invention is not intended to be limited to any theory or explanation of why this unusual relatively non-selective solubility is shown. Such wide ranges of solubilities are very rare among azo coloring matters.

It is an advantage of the present invention that the materials going into the preparation of the salts are of moderate cost and commercial grades may be used. The aminoalkyl polyalkyl polyhydrophenanthrenes are known commercially as "Rosinamines" and the commercial products are useful in preparing the compounds of the present invention. Complete chemical purity is not necessary.

The present invention is not limited to any particular process of preparing the compounds but it is an advantage that they may be made in good yields by an extremely simple process. The azo dye is dissolved in a minimum amount of water and the Rosinamine dissolved likewise in a minimum amount of water with sufficient organic acid such as formic ar acetic acid to give a slight excess over neutrality. The two solutions, if necessary with additional water, are mixed in a vessel and stirred, the temperature being preferably slightly above room temperature, for example, around 30° C. The product is formed as a readily filterable slurry.

Not only can the highly soluble compounds of the present invention be used by themselves, but the solubility is so extraordinarily high, that they may actually be mixed with other salts of the same azo dyestuff, for example, they may be mixed with the corresponding dibutylamine salt in equal amounts without impairing the advantages of the products. The mixed salts may be prepared separately and then combined or they may be produced in a single operation from a mixture of the corresponding amines. Other alkylamine salts such as diamyl amine, lauryl amine and the like may also be used.

The invention will be described in greater detail in conjunction with the following specific examples, all parts being by weight unless otherwise specified.

Example 1

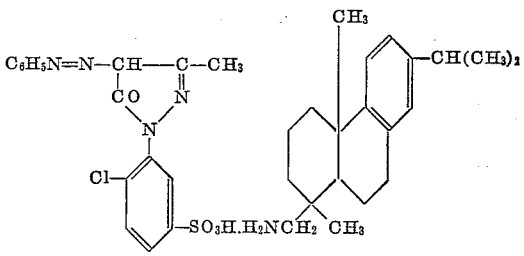

Aniline is diazotized in the ordinary way and coupled on 1-(2'-chlor-5'-sulfophenyl)-3-methyl-5-pyrazolone by known procedures, the resulting yellow dye being filtered and dried. A solution is prepared from 150 parts of this product and 3750 parts of water. In a separate tub 90 parts of the Rosinamine of the above formula and 19 parts of 90% formic acid are dissolved in 1300 parts of water, with warming to 65° C.

The above prepared solutions of dyestuff and amine are added simultaneously with stirring to 500 parts of water in a tub, the temperature being maintained between 27–30° C. Addition of the two solutions is regulated so as to be completed simultaneously, after which the mixture is stirred for an additional brief period. The product is filtered, washed with water, and dried at approximately 120° C. The yield is 202 parts.

Best results are obtained by observing the above specified temperature of 27–30° C. during the addition. Higher temperatures tend to cause gumming, while at lower temperatures the product is less pure.

Example 2

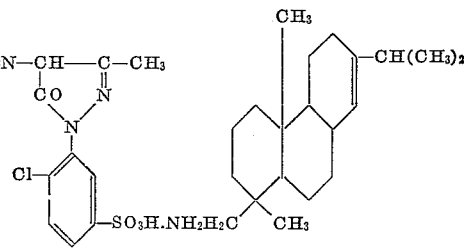

The procedure of the preceding example is followed, replacing the Rosinamine by an equal weight of the Rosinamine of the above formula. Similar results are obtained.

These products have excellent solubility in both polar and non-polar organic solvents. For example, they dissolve substantially completely in as little as 3–4 times their weight of methanol, toluene, or ethyl acetate, to give bright yellow solutions. They are also soluble in carbon tetrachloride, diethylene glycol, naptha, and oleic acid. Solubility in water is slight.

*Example 3*

32 parts of the azo dyestuff of the preceding examples and 6.0 parts of sodium acetate are dissolved in 1600 parts of water at 50° C., the solution then being cooled to 4° C. In a separate tub, a solution is prepared from 125 parts of water, 7.8 parts of glacial acetic acid, 8.2 parts of dibutylamine, and 16.6 parts of the Rosinamine of Example 1. This solution is cooled to 10° C. by adding ice, and then slowly added with stirring to the dyestuff solution at a temperature of 4–6° C. The product separates as a yellow precipitate and is filtered. If desired, it may be washed with a dilute solution of the amine acetic acid mixture to remove inorganic material. It is then dried and ground to a bright yellow powder.

We claim:

1. Coloring matter having the formula

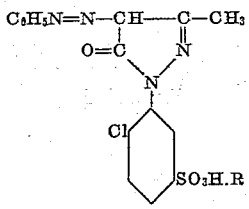

in which R is an amine selected from a group consisting of

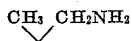
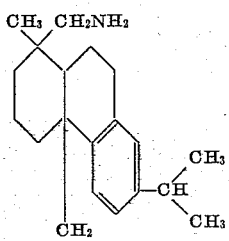

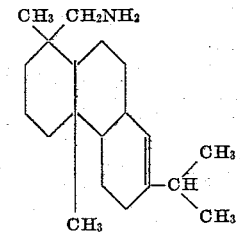

the bond between the sulfonic group and the amine being that of an ordinary amine addition salt.

2. A coloring composition comprising a mixture of the compound of claim 1 and a compound having the formula

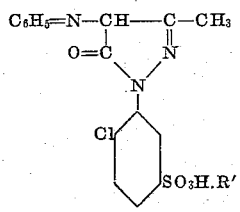

in which R' is an alkyl amine, the bonding between the sulfonic acid and the amine being that of an ordinary amine addition salt, and the amount of the second constituent not exceeding that of the first.

3. A coloring matter having the following formula

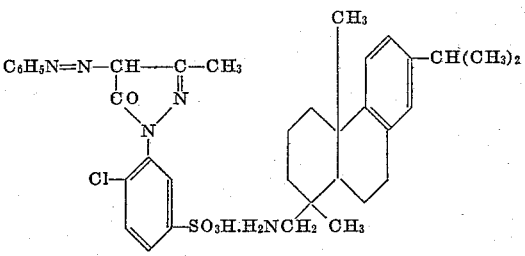

4. A coloring matter of the following formula

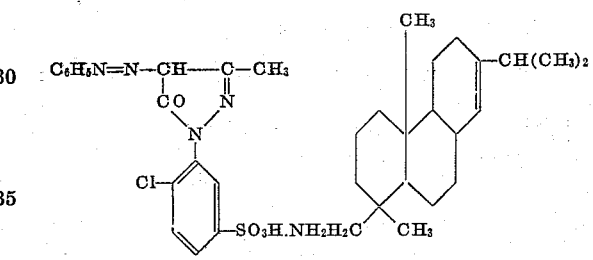

5. A product according to claim 2 in which the alkylamine is dibutyl amine.

References Cited in the file of this patent

UNITED STATES PATENTS

| | | |
|---|---|---|
| 1,511,074 | Geller | Oct. 7, 1924 |
| 2,038,298 | Kiernan | Apr. 21, 1936 |
| 2,367,001 | Campbell | Jan. 9, 1945 |
| 2,490,703 | Paige | Dec. 6, 1949 |
| 2,520,901 | Benoit | Sept. 5, 1950 |
| 2,571,716 | Hess | Oct. 16, 1951 |